US006393036B1

(12) United States Patent
Kato

(10) Patent No.: US 6,393,036 B1
(45) Date of Patent: May 21, 2002

(54) DEVICE FOR A METHOD OF PULSING AND AMPLIFYING SINGLEMODE LASER LIGHT

(75) Inventor: Hajime Kato, Nara (JP)

(73) Assignee: Kobe University, Kobe (JP)

( * ) Notice: Subject to any disclaimer, the term of this patent is extended or adjusted under 35 U.S.C. 154(b) by 0 days.

(21) Appl. No.: 09/481,941

(22) Filed: Jan. 13, 2000

(30) Foreign Application Priority Data

Jan. 14, 1999 (JP) ............................................. 11-007354

(51) Int. Cl.[7] .............................. H01S 3/098; H01S 3/10; H01S 3/13
(52) U.S. Cl. .............................. 372/18; 372/19; 372/22; 372/25; 372/29.022
(58) Field of Search .............................. 372/18, 10, 12, 372/13, 14, 19, 20, 22, 21, 25, 29.022, 31, 97, 99

(56) References Cited

U.S. PATENT DOCUMENTS 5,311,351 A    5/1994  Chesnoy
5,367,531 A  * 11/1994  Eguchi et al. ................. 372/98

FOREIGN PATENT DOCUMENTS

GB    1256550    12/1971
JP    61145884    7/1986
JP    05160519    6/1993

OTHER PUBLICATIONS

Forrest M. Mims III, Engineer's Mini–Notebook, cat. No. 62–52001 and cat No. 276–5016A, 1994, pp. 48 and 25.*

* cited by examiner

*Primary Examiner*—Frank G. Font
*Assistant Examiner*—Armando Rodriguez
(74) *Attorney, Agent, or Firm*—Stevens, Davis, Miller & Mosher, LLP

(57) ABSTRACT

A device for and a method of pulsing and amplifying a singlemode laser light for use in a pulse oscillation laser is disclosed. The device comprises a singlemode laser for generating the laser light of the singlemode, an optical resonator into which the outputted laser light is introduced from the singlemode laser, and a controller for controlling the length of resonator by changing the length of the optical resonator based on a control waveform signal, which is an asymmetrical triangular repeated waveform signal. The laser pulse light of the singlemode to which optical strength is amplified from the optical resonator, is outputted by changing the length of resonator.

12 Claims, 7 Drawing Sheets

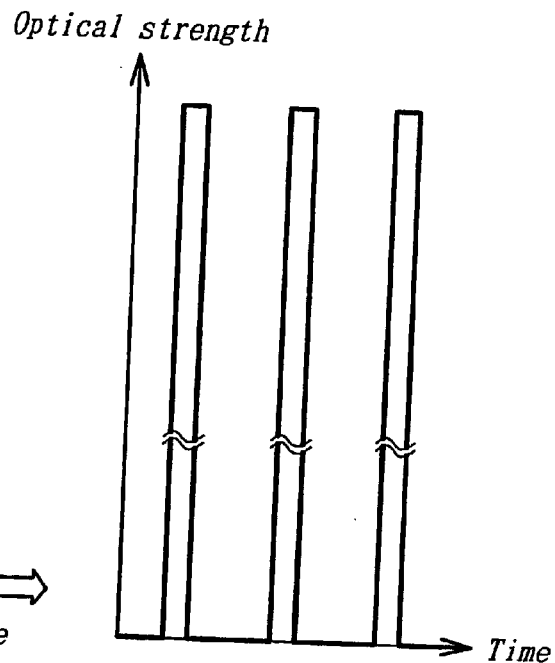
FIG. 4b
FIG. 4a
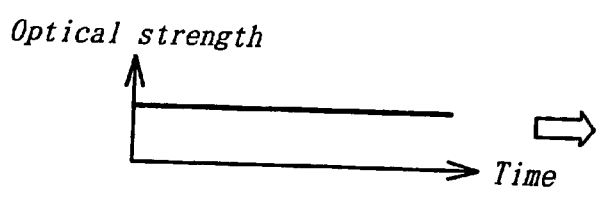
FIG. 4c
FIG. 4d
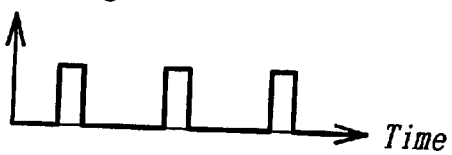

DEVICE FOR A METHOD OF PULSING AND AMPLIFYING SINGLEMODE LASER LIGHT

BACKGROUND OF THE INVENTION

1. Field of the Invention

The present invention relates to a device for and a method of pulsing and amplifying a singlemode laser light without harming the monochromaticity.

2. Related Art Statement

Recently, development and progression of the pulse oscillation laser are remarkably, so that the pulse laser of various ultra short time oscillations is proposed. In such a pulse laser, since an indeterminacy principle is approved between energy and time, so that the line width of the laser light becomes broaden while becoming an ultra short time oscillation, and the monochromaticity becomes worsen. By considering this respect, if the laser light from the single frequency laser with an excellent monochromaticity of the continuous oscillation is pulsed, though there is a certain limit to shorten the oscillation time, the pulsing (the optical output pulse is outputted for a short time) while maintaining the goodness of the monochromaticity, becomes possible.

As a conventional technology which pulses the laser light of the continuous oscillation, (1) a method of using a mechanical chopper, in which light is intercepted by rotating a disk with a hole so as to intercept light, except when the light is passed through the hole, and (2) a method of using an optical chopper, in which the polarizing direction of light is changed with an electro-optic (Electro Optic: EO) element and an acousto-optic (Acusto Optical: AO) element, and the phenomenon that the light does not pass a polarizer set up after these elements, are used.

However, the power of the thus obtained laser pulse light (power output) becomes lower, since the amplitude of light (strength of light) does not change before and after the pulsing when the continuous oscillation laser light is pulsed by using the above described mechanical chopper and optical chopper, and the amplification operation of the amplitude of light (strength of light) cannot be achieved.

SUMMARY OF THE INVENTION

It is an object of the present invention to eliminate the above described disadvantages of the conventional device for and method of obtaining a high powerful laser pulse light.

It is another object of the present invention to provide a device for and a method of obtaining a high powerful laser pulse light with good monochromaticity from the singlemode laser light.

According to the first present invention, there is provided a device for pulsing and amplifying a singlemode laser light comprising a singlemode laser for generating the laser light of the singlemode, an optical resonator into which the outputted laser light is introduced from the singlemode laser, and a controller for controlling the length of resonator by changing the length of the optical resonator based on a control waveform signal, which is an asymmetrical triangular repeated waveform signal, the laser pulse light of the singlemode to which optical strength is amplified from the optical resonator, is outputted by changing the length of resonator.

According to the first invention, the resonator length of the optical resonator, into which the laser light emanated from the singlemode laser is introduced, changes based on the controlling waveform signal according to the resonator length controller. The amplification of the optical power causes when the resonator length becomes a multiple of the half-wave length of the incident laser light during the change in the resonator length of the optical resonator, and the optical power (strength) becomes 0 at the rest. Therefore, the laser pulse light of the singlemode with high power can be obtained as a power output of the optical resonator.

According to the second present invention, there is provided a device for pulsing and amplifying a singlemode laser light comprising a singlemode laser for generating laser light of singlemode, an optical resonator into which the outputted laser light is introduced from the singlemode laser, an optical path interception means to intercept the optical path between the singlemode laser and the optical resonator, a resonator length controller by which the resonator length of the optical resonator is changed based on a controlling waveform signal, and a driving means for operating the optical path interception means from the leading time of the laser pulse light output from the optical resonator during the fixed time after a lapse of the given delay time, by changing the length of resonator, the laser pulse light of the singlemode to which optical strength is amplified and the trailing time is shortened, is outputted from the optical resonator.

According to the second invention, the resonator length of the light resonator into which the laser light emanated from the singlemode laser is introduced, changes based on the controlling waveform signal according to the resonator length controller. Since the amplification of the optical strength causes when the resonator length becomes a multiple of the half-wave length of the incident laser light during the change in the resonator length of the optical resonator, and the optical strength becomes 0 at the rest, the laser pulse light is output from the optical resonator. And, since the driving means operates with a certain time the optical path interception means by which the optical path between the singlemode laser and the optical resonator is intercepted from the leading time of the laser pulse light after a lapse of the given delay time. The laser pulse light of the singlemode having high power as a power output of the optical resonator and the shortened trailing time, can be obtained.

It is preferable that the controlling waveform signal is an asymmetrical triangular repeated waveform signal.

According to the above invention, since an asymmetrical triangular repeated waveform signal is used as the controlling waveform signal, by setting the resonator length so as to become a multiple of the half-wave length of the incident laser light at two places as per one asymmetrical triangular waveform signal in the process of the change in the resonator length of the optical resonator, so that the laser pulse light with a large optical strength can be obtained in the case of slow change speed of the resonator length rather than in the case of fast change speed thereof and the difference of optical strength between two laser pulse lights becomes large.

It is also preferable that a double wave generating element is provided in the optical resonator, and the laser pulse light outputted from the optical resonator is made double wave.

According to the above invention, since the double wave generating element is installed in the optical resonator, the laser pulse light output from the optical resonator can be made twice wave by the double wave generating element.

According to the present invention, there is provided a method of pulsing and amplifying a singlemode laser light comprising steps of introducing the laser light emanated from the singlemode laser into the optical resonator, and of changing the resonator length of the optical resonator based on the controlling waveform signal, which is an asymmetrical triangular repeated waveform signal, thereby outputting the singlemode laser pulse light of which optical strength is amplified, from the optical resonator.

According to the above invention, the resonator length of the optical resonator into which the laser light emanated from the singlemode laser is introduced, changes based on the controlling waveform signal, the amplification of the optical strength causes when the resonator length becomes a multiple of the half-wave length of the incident laser light during the change in the resonator length of the optical resonator, and the optical strength becomes 0 at the rest, therefore, the laser pulse light of the singlemode can be obtained with high power, as an output of the light resonator.

According to the present invention, there is provided a method of pulsing and amplifying a singlemode laser light comprising steps of: introducing the laser light emanated from the singlemode laser into the light resonator; changing the resonator length of the light resonator based on the controlling waveform signal, thereby outputting the laser pulse light from the light resonator; and intercepting the optical path between the singlemode laser and light resonator after a lapse of given delay time from leading time of the laser pulse light for a certain time, thereby outputting the singlemode laser pulse light of which optical strength is amplified, and trailing time is shortened, from the light resonator.

According to the above invention, the resonator length of the optical resonator into which the laser light emanated from the singlemode laser is introduced, changes based on the controlling waveform signal, the amplification of the optical strength causes when the resonator length becomes a multiple of the half-wave length of the incident laser light during the change in the resonator length of the optical resonator, since the optical strength becomes 0 at the rest, the laser pulse light is output from the optical resonator. Also, the optical path between the singlemode laser and the optical resonator is certain time intercepted from the leading time of the laser pulse light after a lapse of the given delay time, so that the laser pulse light of the singlemode having high power as a power output of the optical resonator and the shortened trailing time, can be obtained.

In a preferable embodiment of the method of pulsing and amplifying a singlemode laser light according to the present invention, the controlling waveform signal is an asymmetrical triangular repeated waveform signal.

According to the above invention, since an asymmetrical triangular repeated waveform signal is used as the controlling waveform signal, by setting the resonator length so as to become a multiple of the half-wave length of the incident laser light at two places as per one asymmetrical triangular waveform signal in the process of the change in the resonator length of the optical resonator, so that the laser pulse light with a large optical strength can be obtained in the case of slow change speed of the resonator length rather than in the case of fast change speed thereof and the difference of optical strength between two laser pulse lights becomes large. Therefore, this becomes advantageous to enlarge the amplification degree in the output laser pulse light.

In a preferable embodiment of the method of pulsing and amplifying a singlemode laser light according to the present invention, a double wave generating element is provided with the light resonator, thereby making the laser pulse light outputted from the light resonator wave-doubling.

According to the above invention, since the double wave generating element is installed in the optical resonator, the laser pulse light output from the optical resonator can be made twice wave by the double wave generating element.

BRIEF DESCRIPTION OF THE DRAWINGS

FIGS. 4(a)–4(d) are explanatory views for explaining operations of the device for pulsing and amplifying singlemode laser light of the first embodiment while comparing with the conventional embodiment;

DETAILED EXPLANATION OF THE PREFERRED EMBODIMENT

Figure 1:
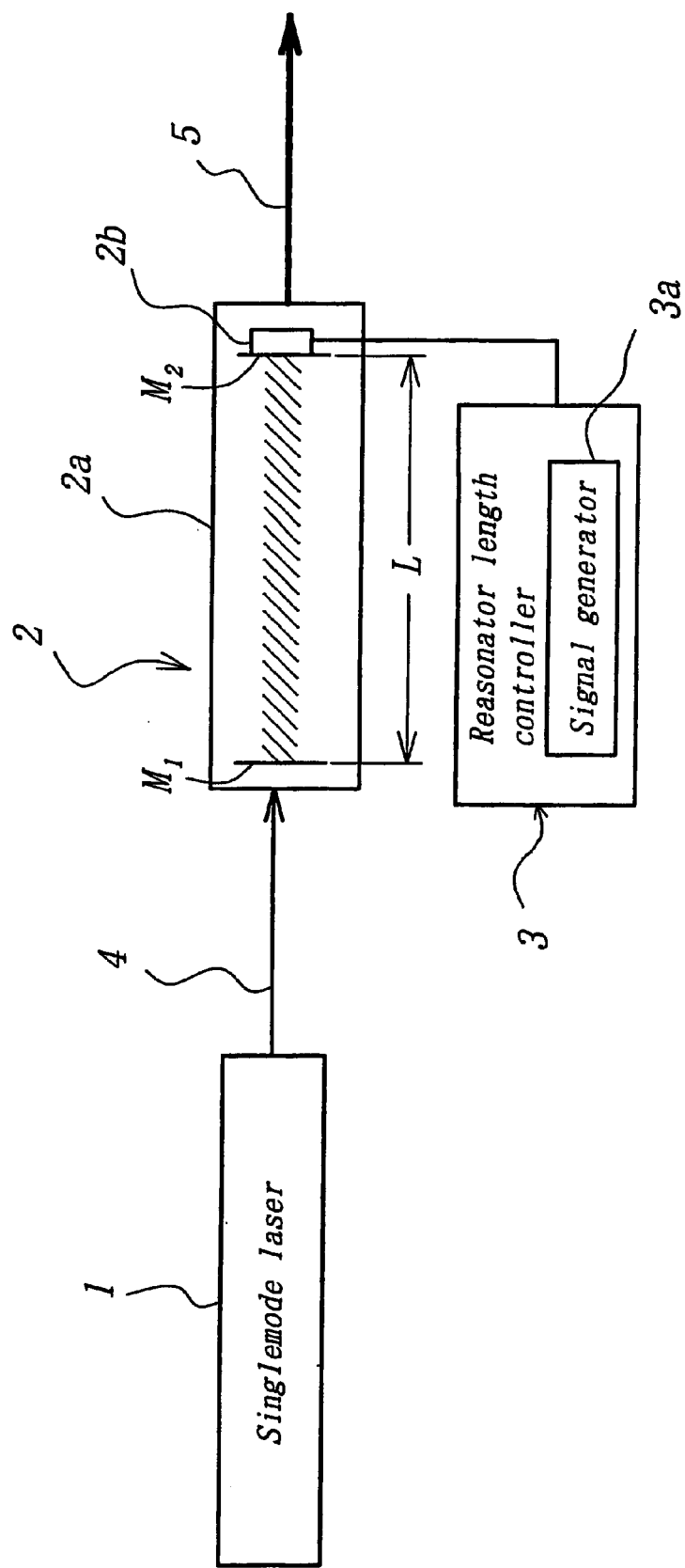
FIG. 1 is an explanatory side view showing first embodiment of a constitution of a device for pulsing and amplifying singlemode laser light according to the present invention.

Now to the drawings, there are shown various embodiments of a according to the present invention. Like parts are shown by corresponding reference characters throughout several views of the drawings.

Hereafter, the embodiment of the present invention is explained in detail based on the drawings. FIG. 1 is a block diagram showing a constitution of a device for pulsing and amplifying a singlemode laser light of a first embodiment according to the present invention. The device for pulsing and amplifying a singlemode laser light comprises a singlemode laser 1, an optical resonator 2, and a resonator length controller 3.

The single frequency laser of the continuous oscillation having excellent monochromaticity is used as the above singlemode laser 1, though the titanium sapphire laser having laser power=1–1000 mW and laser wavelength $\lambda$=400–2000 nm is assumed to be used in this embodiment, but, instead thereof, a semiconductor laser, a dye laser, a solid state laser, and a gas laser, or the like may be used.

Figures 2A, 2B:
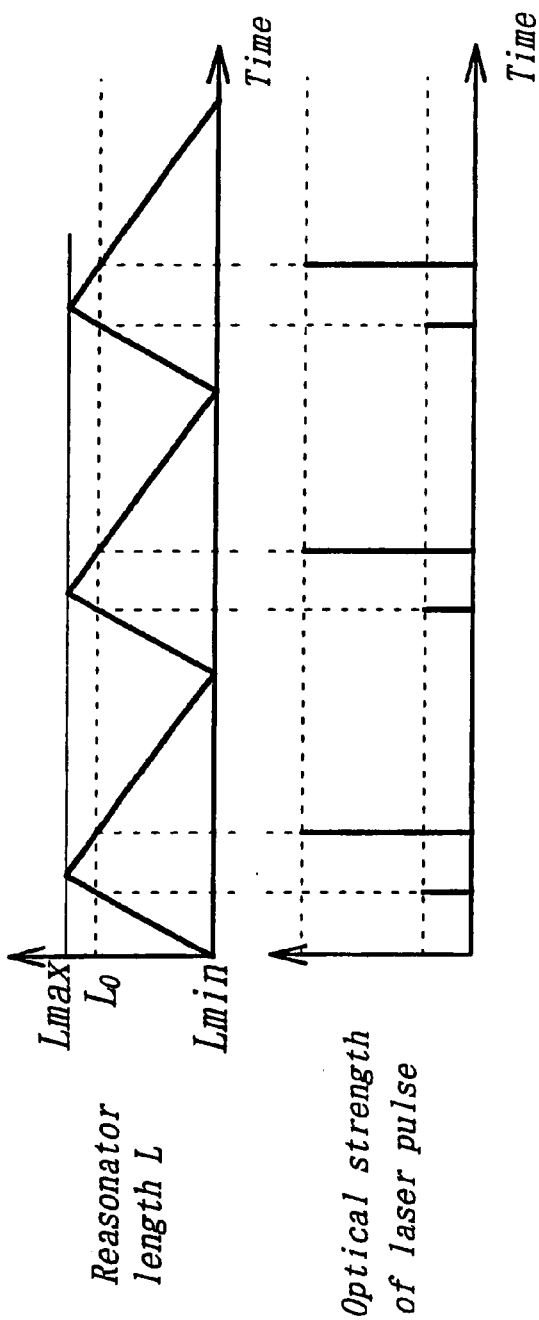
FIG. 2(a) is an explanatory view showing a resonator length control performed by a resonator length controller in the first embodiment and the controlling waveform signal to be used for it.
FIG. 2(b) is an explanatory view showing a waveform of a laser pulse light outputted by the optical resonator in the first embodiment.

The above optical resonator 2 comprises a housing 2a, a couple of mirrors $M_1$ and $M_2$ arranged in opposition to the housing 2a, and a moving mechanism 2b, by which the mirror $M_2$ is relatively moved by a given slight distance to the mirror $M_1$, and the moving mechanism 2b uses, for example, a piezo element. Length L of the resonator of this optical resonator 2 (a distance between the mirror $M_1$ and the mirror $M_2$ shown in FIG. 1) changes continuously from minimum value $L_{min}$ to maximum value $L_{max}$ as shown in FIG. 2(a). The shape of optical resonator changes continuously along with it, too.

The signal generator 3a which generates a controlling waveform signal, is built into the above resonator length controller 3. Resonator length L is changed continuously (periodically) by driving the moving mechanism 2b of the optical resonator 2 based on the controlling waveform signal. In this embodiment, a function generator is used as the above signal generator 3a, and a signal having an asymmetrical triangular repeated waveform is used as the controlling waveform signal, as shown in FIG. 2(*a*). In this asymmetrical triangular repeated waveform signal, the leading edge portion of the asymmetrical triangle is set for the speed by which the length L of the resonator is changed to quicken more than the trailing edge portion thereof.

Next, the operation of this embodiment is explained. A laser light 4 (continuous oscillation light) emanated from a singlemode laser 1 is introduced into a light resonator 2, and a resonator length L thereof is continuously changed by a resonator length controller 3. Concretely, an asymmetrical triangular repeated waveform signal as illustrated in FIG. 2(*a*) is generated by a signal generator 3a. Length L of the resonator is periodically changed from a minimum value $L_{min}$ to a maximum value $L_{max}$ by using this signal. In this case, only when the resonator length L of the optical resonator 2 becomes equal to a multiple of $\lambda/2$, which is the half-wave length of introduced laser light 4, (however, n is an integer, in embodiment of FIG. 2(*a*), at $L=L_0=n\lambda/2$), the resonance phenomena of the light wave arises, thereby increasing light strength. The laser pulse light 5 is output from the optical resonator 2 as the optical strength increases. In the laser pulse light 5, as illustrated in FIG. 2(*b*), the pulsed light having a stronger optical strength is obtained in the case that the speed for changing the resonator length L is slow (in the case of the laser pulse corresponding to a right oblique side of asymmetrical triangular of FIG. 2(*a*)) rather than fast (in the case of the laser pulse corresponding to a left oblique side thereof), so that an application method of extracting only the pulsed light in one where the optical strength difference is enlarged and the optical strength is large or the like, can be adopted.

Figure 3:
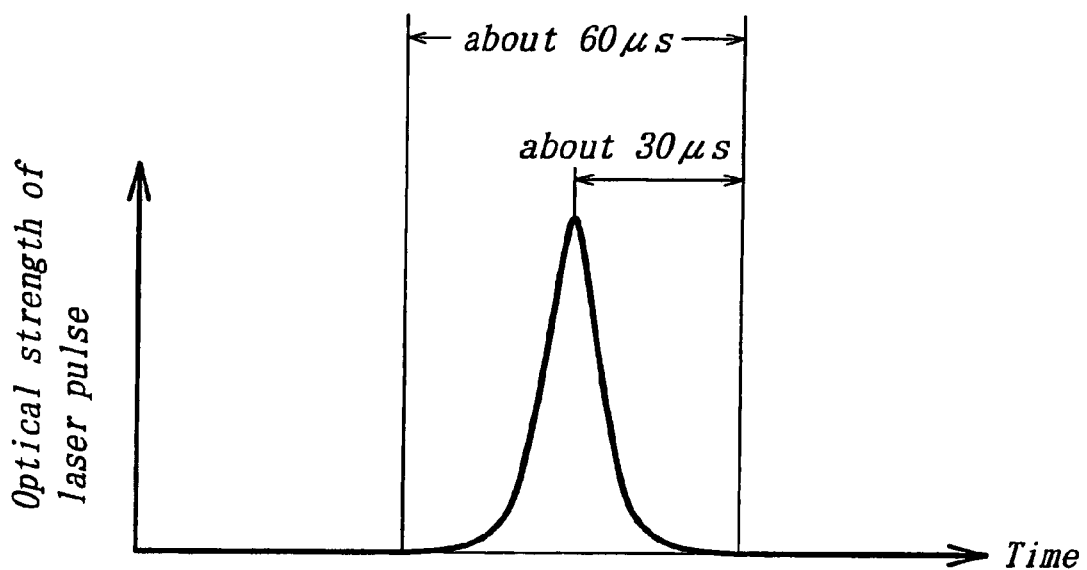
FIG. 3 is an explanatory view showing a shape of waves of the laser pulse light outputted from the optical resonator in the first embodiment.

In the above, assuming that $L_0$ is about 20 cm, and a repeated frequency is 400 Hz, and when the above asymmetrical triangular repeated waveform signal is generated, a laser pulse power output of wave as shown in FIG. 3 is obtained as a power output of optical resonator 2 for the laser light of about $\lambda=638$ nm (moreover, only large one of two laser pulse outputs of FIG. 2(*b*) is shown in FIG. (3)). In this case, the strength of light is amplified to about 50 times, and the time width from the rise of the laser pulse output to the standing fall is about 60 $\mu$s, and the trailing time is about 30 $\mu$s.

The device for pulsing and amplifying the singlemode laser light in this embodiment has the following advantages to the conventional technology. That is, when the laser pulse light shown in FIG. 4(*d*) is obtained by pulsing the continuous oscillation laser light shown in FIG. 4(*c*) with the use of the above described conventional mechanical chopper and the optical chopper, the amplitude of light (strength of light) becomes the same before and after pulsing, but when the continuous oscillation laser light shown in FIG. 4(*a*) is pulsed with the amplifying device of pulsing the singlemode laser light in this embodiment, the laser pulse light, to which the strength of the light (amplitude of light) as shown in FIG. 4(*b*) is amplified with high amplification degree, can be obtained without ruining the goodness of the monochromaticity of the singlemode laser, (Moreover, FIG. 4(*b*) shows the shape of waveform when only large one in two laser pulse power outputs shown in FIG. 2(*b*) is extracted).

Moreover, the device of pulsing and amplifying the singlemode laser light in this embodiment can be applied to a laser modulator, a time-variation measuring device, and various optical instruments, or the like. In addition, the device for pulsing and amplifying the singlemode laser light of the present embodiment can change the pulse width of the laser pulse light output from the optical resonator 2 and a generation time interval by properly adjusting the shape of the above asymmetrical triangular repeated waveform signal.

Figure 5:
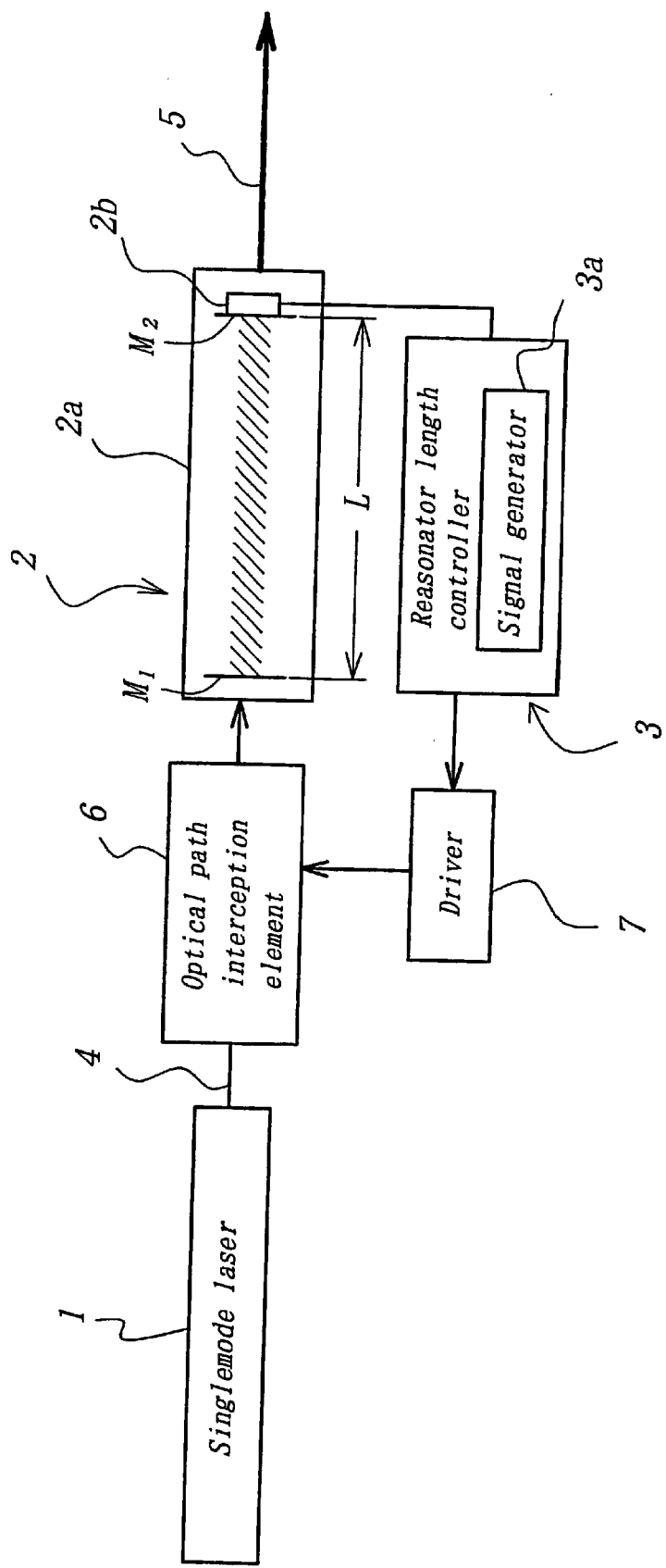
FIG. 5 is an explanatory side view showing second embodiment of a constitution of a device for pulsing and amplifying singlemode laser light according to the present invention.

FIG. 5 is a figure showing the constitution of the device for pulsing and amplifying the singlemode laser light of the second embodiment according to the present invention. The device for pulsing and amplifying a singlemode laser light according to the present embodiment is a device to which an optical path interception element 6 which intercepts the optical path between the singlemode laser 1 and the optical resonator 2 and a driving machine 7 which certain time operates the optical path interception element 6 from the leading time of the laser pulse light 5 output from the optical resonator 2 after a lapse of the given delay time to the above first embodiment, and the other portion thereof are constituted as well as the above first embodiment. Moreover, in the present embodiment, even though acousto-optic (AO) element is used as the above optical path interception element 6, but instead thereof, an electro-optics (EO) element may be used.

The present embodiment considered that the trailing time should be short in the case of constituting it as the time-variation measuring device, which measures a change with the lapse of time after light is excited. The driving machine 7 is made to operate the optical path interception element 6 certain time after a lapse of the given delay time from the leading time of laser pulse light 5 output from the optical resonator 2 in order to realize shortening of such a trailing time.

Figure 6:
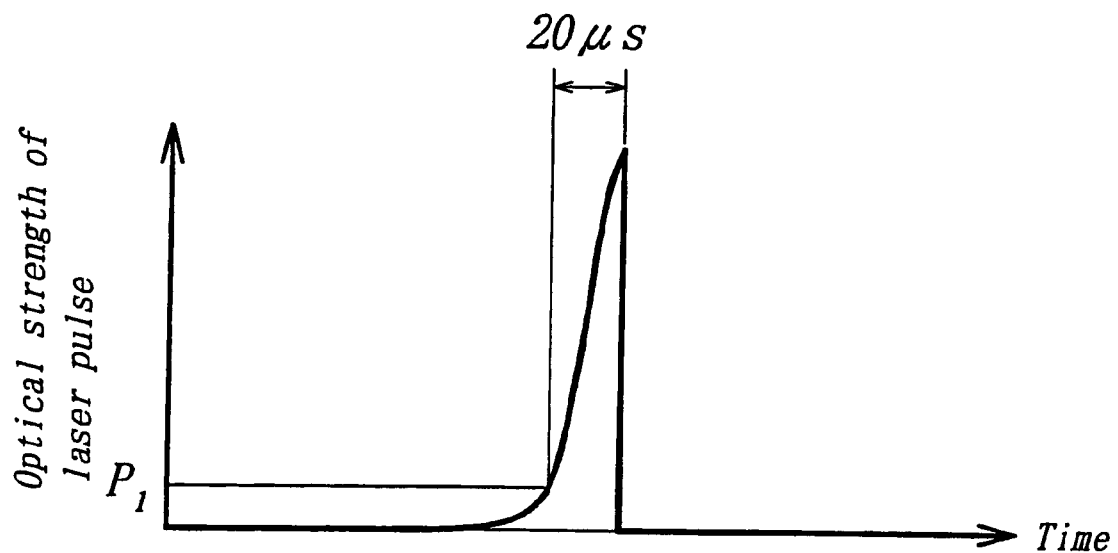
FIG. 6 is an explanatory view showing a shape of waves of the laser pulse light outputted from the optical resonator in the second embodiment.

Concretely, it is difficult to detect the leading time of the laser pulse light 5, so that the laser light 4 incident on the optical resonator 2 is cut with the electro-optical device as the optical path interception element, after the delay time of 20 $\mu$s is put based on a point that the optical strength exceeds threshold $P_1$ after the leading time of the laser pulse light 5. In this case, the trailing time of the electro-optical device is short, so that the laser pulse light with a short trailing time as shown in FIG. 6 can be obtained. Moreover, in the embodiment shown in FIG. 6, the trailing time of the laser pulse light (the time until the optical strength decreases from the peak magnitude to almost 0) is about 0.01 $\mu$s.

According to the device for pulsing and amplifying the singlemode laser light of the present embodiment, the function and effect of the above first embodiment can be obtained, and also the laser pulse light having the trailing time shortened compared with the case of the first embodiment, can be obtained, so that when this is applied to the time-variation measuring device, the device for pulsing and amplifying the singlemode laser light of the present embodiment particularly becomes advantageous.

Figure 7:
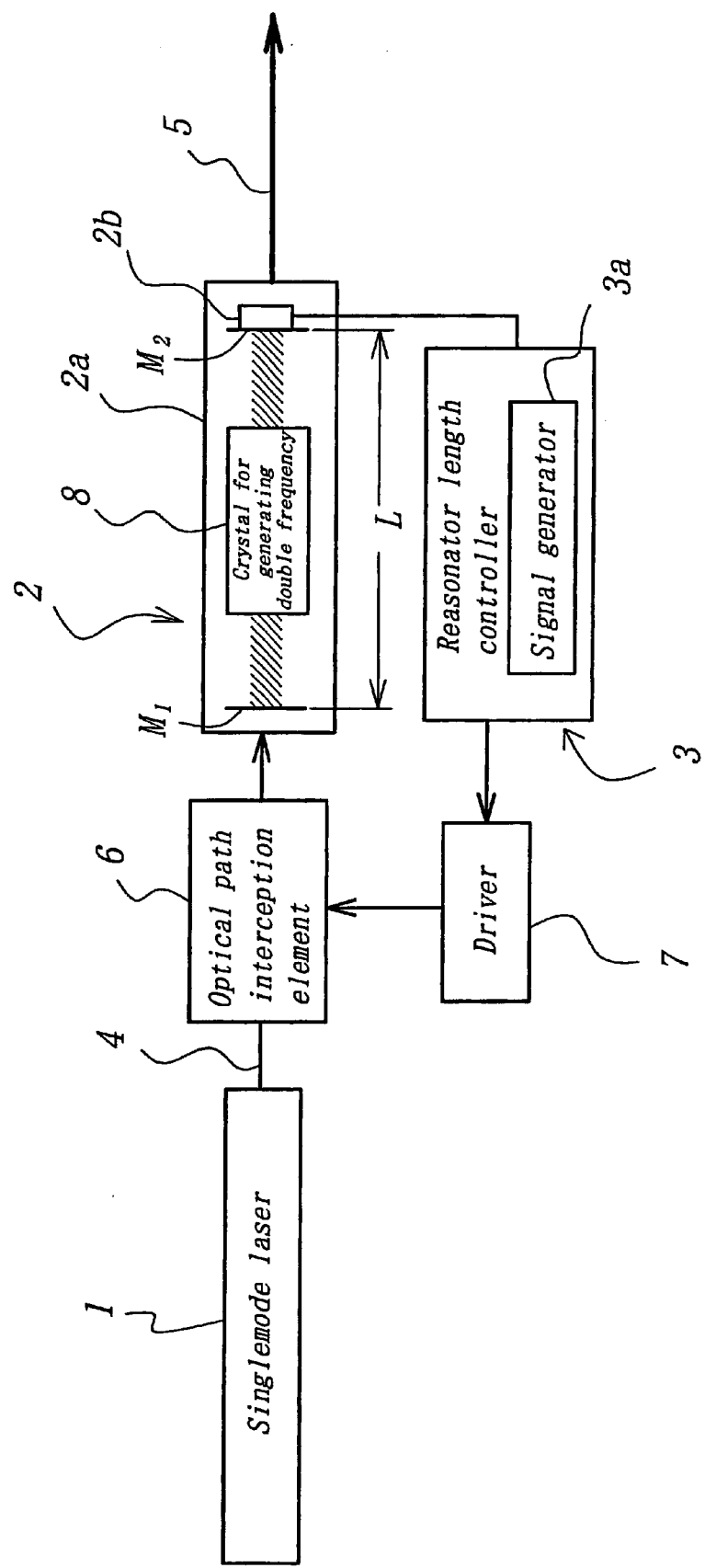
FIG. 7 is an explanatory side view showing third embodiment of a constitution of a device for pulsing and amplifying singlemode laser light according to the present invention.

FIG. 7 is a figure showing the constitution of the device for pulsing and amplifying a singlemode laser light in third embodiment according to the present invention. The device for pulsing and amplifying the singlemode laser light of the present embodiment is a device which added a crystal 8 for the twice wave generation to the above second embodiment as a double wave generating element between the mirror $M_1$ of the optical resonator 2 and the mirror $M_2$. Other portions thereof are constituted as well as the above second embodiment. Moreover, the crystal 8 for the twice wave generation may be added between the mirror $M_1$ and the mirror $M_2$ of the optical resonators 2 to the above first embodiment.

According to the device for pulsing and amplifying a singlemode laser light of the present embodiment, the laser power has been amplified in the optical resonator 2, so that the pulsed laser light being made twice wave can generated with excellent efficiently by the operation of the crystal 8 for the twice wave generation installed in the optical resonator 2.

What is claimed is:

1. A device for pulsing and amplifying a singlemode laser light comprising a singlemode laser for generating the laser light of the singlemode, an optical resonator into which the outputted laser light is introduced from the singlemode laser, and a controller for controlling the length of resonator by changing the length of the optical resonator based on a control waveform signal, which is an asymmetrical triangular repeated waveform signal, the laser pulse light of the singlemode to which optical strength is amplified from the optical resonator, is outputted by changing the length of resonator.

2. A device for pulsing and amplifying a singlemode laser light comprising a singlemode laser for generating laser light of singlemode, an optical resonator into which the outputted laser light is introduced from the singlemode laser, an optical path interception means to intercept the optical path. between the singlemode laser and the optical resonator, a resonator length controller by which the resonator length of the optical resonator is changed based on a controlling waveform signal, and a driving means for operating the optical path interception means from the leading time of the laser pulse light output from the optical resonator during the fixed time after a lapse of the given delay time, by changing the length of resonator, the laser pulse light of the singlemode to which optical strength is amplified and the trailing time is shortened, is outputted from the optical resonator.

3. A device for pulsing and amplifying a singlemode laser light as claimed in claim 2, wherein the controlling waveform signal is an asymmetrical triangular repeated waveform signal.

4. A device for pulsing and amplifying a singlemode laser light as claimed in claim 1, wherein a double wave generating element is provided in the optical resonator, and the laser pulse light outputted from the optical resonator is made double wave.

5. A method of pulsing and amplifying a singlemode laser light comprising steps of introducing the laser light emanated from the singlemode laser into the optical resonator, and of changing the resonator length of the optical resonator based on the controlling waveform signal, which is an asymmetrical triangular repeated waveform signal, thereby outputting the singlemode laser pulse light of which optical strength is amplified, from the optical resonator.

6. A method of pulsing and amplifying a singlemode laser light comprising steps of: introducing the laser light emanated from the singlemode laser into the light resonator; changing the resonator length of the light resonator based on the controlling waveform signal, thereby outputting the laser pulse light from the light resonator; and intercepting the optical path between the singlemode laser and light resonator after a lapse of given delay time from leading time of the laser pulse light for a certain time, thereby outputting the singlemode laser pulse light of which optical strength is amplified, and trailing time is shortened, from the light resonator.

7. A method of pulsing and amplifying a singlemode laser light as claimed in claim 6, wherein the controlling waveform signal is a asymmetrical triangular repeated waveform signal.

8. A method of pulsing and amplifying a singlemode laser light as claimed in claim 5, wherein a double wave generating element is provided with the light resonator, thereby making the laser pulse light outputted from the light resonator wave-doubling.

9. A device for pulsing and amplifying a singlemode laser light as claimed in claim 2, wherein a double wave generating element is provided in the optical resonator, and the laser pulse light outputted from the optical resonator is made double wave.

10. A device for pulsing and amplifying a singlemode laser light as claimed in claim 3, wherein a double wave generating element is provided in the optical resonator, and the laser pulse light outputted from the optical resonator is made double wave.

11. A method of pulsing and amplifying a singlemode laser light as claimed in claim 6, wherein a double wave generating element is provided with the light resonator, thereby making the laser pulse light outputted from the light resonator wave-doubling.

12. A method of pulsing and amplifying a singlemode laser light as claimed in claim 7, wherein a double wave generating element is provided with the light resonator, thereby making the laser pulse light outputted from the light resonator wave-doubling.

* * * * *